Jan. 3, 1933.                F. T. DOUILLARD                1,893,022
                                  METER
                         Filed Dec. 24, 1930
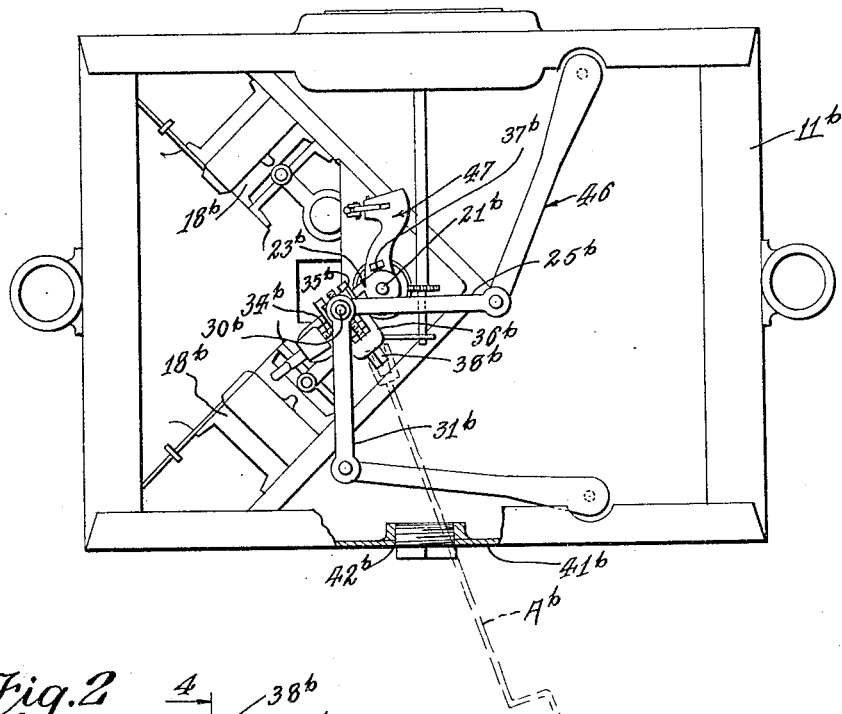
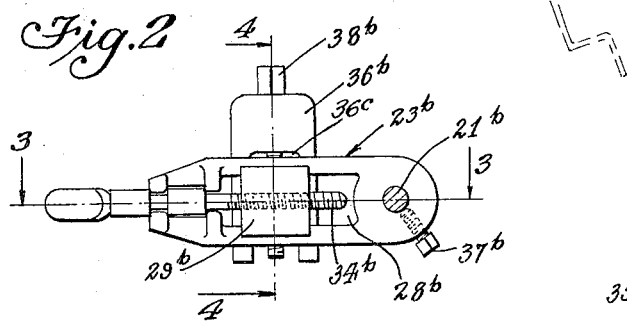
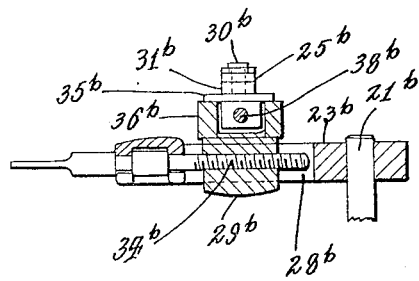
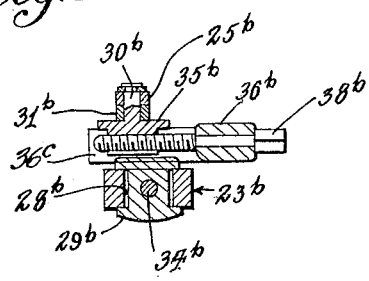
Inventor
Frank T. Douillard
By Lyon & Lyon
Attorneys Patented Jan. 3, 1933

1,893,022

UNITED STATES PATENT OFFICE

FRANK T. DOUILLARD, OF LOS ANGELES, CALIFORNIA, ASSIGNOR OF ONE-HALF TO SOUTHERN CALIFORNIA GAS COMPANY, OF LOS ANGELES, CALIFORNIA, A CORPORATION OF CALIFORNIA

METER

Application filed December 24, 1930. Serial No. 504,543.

This invention relates to meters of the type, for example, employed for metering gas, and an object, in general, is to facilitate the adjustment of the timing of the valve means.

It is customary to check the accuracy of meters of this type, at intervals, and, especially, if for any reason it appears that inaccuracies have developed in the metering of the gas. In order to test the meter for accuracy, it is connected up to a gas meter prover and if any inaccuracy is found in the registration of the tested meter, the timing of the valve is altered and the meter is again tested and the testing and adjusting of the timing are repeated until the registering of the tested meter is the same as that of the gas meter prover. At present, the adjusting of the timing of the valve is very inconvenient and, accordingly, expensive, because much time is consumed in making the necessary adjustments.

The valve or valves of the meter that control the flow of gas into the meter are usually driven by a crank on a shaft that is driven by a moving part of the meter. Two adjustments of the crank pin are necessary: one substantially radially on the crank pin to change the stroke of the valves, and another in a tangential direction to change the time of opening and closing of the valves. It has been the practice heretofore to provide a removable plug in the side wall of the casing of the meter through which a tool, such as a long stem socket wrench, may be inserted to effect the adjustments.

The general object of this invention is to provide a simple construction for mounting the crank pin on the crank which will enable it to be readily adjusted longitudinally of the crank or in a direction at right angles to the crank and to provide a construction of this type which may be readily reached for adjustment through an opening in the casing of the meter.

Further objects of the invention will appear hereinafter.

The accompanying drawing illustrates the invention:

Fig. 1 is a plan view, with cover omitted, of a meter having a slide valve system used in meters of this type.

Fig. 2 is an enlarged, inverted plan view of a portion of the valve-operating mechanism shown in Fig. 1.

Fig. 3 is a horizontal section on the line indicated by 3—3, Fig. 2.

Fig. 4 is a vertical section on the line indicated by 4—4, Fig. 2.

Now describing the invention illustrated in Figs. 1 to 4 of the drawing, a plurality of slide valves 18b are employed.

The mechanism that operably connects the shaft 21b with the motor, not shown, is indicated in general by the character 46 and it need not be described in detail, except in respect to that portion of said mechanism that embodies one form of the invention. Furthermore, the shaft 21b is connected by wellknown mechanism, indicated at 47, to the valves 18b for operating said valves.

The mechanism 46 includes a crank 23b which is fixed to the shaft 21b by a set screw 37b or its equivalent. The crank 23b carries a slide 29b which is in the form of a block adjustable by a screw 34b mounted in a longitudinal slot 28b in the crank 23b. Movement of the slide 29b is longitudinal of the crank and is for the purpose of changing the length of the stroke of the crank, the same as is effected by adjustment of the slide 29 in Fig. 2.

The construction of the crank 23b so far described, is not new and is well understood by those versed in this art, and the particular feature that differentiates from the prior art will now be described:

The slide 29b is suitably connected with the link 31b. In this instance, the link 31b is adjustably connected with the slide 29b and to accomplish this, the slide 29b carries a guide member 36b having a longitudinal slot 36c in which is adjustably mounted a slide 35b. Thus the members 35b, 36b, are relatively adjustable.

A screw 38b is mounted in the member 36b and is threaded into the slide 35b for effecting translation of said slide and, it is to be noted, that the slide 35b moves transversely of the crank 23b or, in other words, transversely to the path of movement of the slide 29b.

The slide 35b carries a pivot 30b for pivotally connecting the links 25b and 31b with said slide 35b.

In this instance, the position of the head of the screw 38b is such that in order to apply the wrench Ab to said head, the opening 42b is in the rear wall 41b of the meter case 11b.

This embodiment of the invention operates as follows: To change the angular relation between the shaft 21b and the pivot 30b, so as to effect a change in the timing of the valve operation, the wrench will be inserted through the opening 42b and engaged with the head of the screw 38b and such wrench will be turned in the appropriate direction so as to cause adjustment of the slide 35b transversely of the longitudinal axis of the crank 23b, thus not materially altering the throw of the crank 23b but advancing or retarding the valve operation with respect to the movement of the diaphragms.

It is understood that the embodiment of the invention described herein is only one of the many embodiments this invention may take, and I do not wish to be limited in the practice of my invention, nor in my claims, to the particular embodiment set forth.

I claim:

1. In a meter having a valve-operating shaft, the combination of a crank fixed to the shaft and having a longitudinal slot, a slide guided in said slot, an adjusting screw having threaded engagement with said slide for adjusting the same in either direction longitudinally of the crank, said slide having an extension with a slot extending transversely to the crank, a second slide guided in said last-named slot, an adjusting screw having threaded engagement with the last named slide for adjusting the same in either direction along its slot, a crank pin carried on the last named slide, and means for connecting the crank-pin to a moving part of the meter for driving the shaft.

2. In a meter having a valve operating shaft, the combination of a crank fixed to the shaft and having a longitudinal slot, a slide guided in said slot, an adjusting screw mounted in the crank extending longitudinally of the slot and having threaded engagement with said slide for adjusting the same longitudinally of the crank, said slide having an extension with a slot extending transversely to the crank, a second slide guided in said last named slot, an adjusting screw mounted in said extension extending longitudinally of the second named slot and having threaded engagement with the second slide for adjusting the same along its slot and a crank pin carried on the last named slide, and means for connecting the crank-pin to a moving part of the meter for driving the shaft.

Signed at Los Angeles, California this 9th day of December, 1930.

FRANK T. DOUILLARD.